United States Patent [19]
Kuhl et al.

[11] 3,827,518
[45] Aug. 6, 1974

[54] SUSPENSION SYSTEM FOR HITCH ASSEMBLY

[75] Inventors: Bernard A. Kuhl, Mayfield Heights; John B. Mason, Hudson, both of Ohio

[73] Assignee: General Motors Corporation, Detroit, Mich.

[22] Filed: Aug. 23, 1973

[21] Appl. No.: 390,694

[52] U.S. Cl. ................. 180/12, 280/492, 280/124 F
[51] Int. Cl. .............................................. B60g 5/06
[58] Field of Search ........... 180/14 R, 14 A, 11, 12, 180/51, 79.2 B; 280/405 R, 406 R, 492, 423 R, 124 F

[56] References Cited
UNITED STATES PATENTS

| | | | |
|---|---|---|---|
| 3,123,381 | 3/1964 | Poore | 180/79.2 B |
| 3,565,460 | 2/1971 | Knell | 280/492 |

*Primary Examiner*—M. Henson Wood, Jr.
*Assistant Examiner*—Robert Saifer
*Attorney, Agent, or Firm*—Edward J. Biskup

[57] ABSTRACT

A suspension system for the hitch assembly of an articulated scraper for controlling bounce and pitch type movement of the tractor and the trailing unit. The suspension system is located below the steering frame and includes front and rear links of equal length that are arranged so that straight lines passing through the centers of the pivotal connections of each link intersect at a point located between the front and the rear axles of the vehicle. A spring device is pivotally connected between the hitch assembly and the tractor for cushioning relative movement therebetween.

2 Claims, 4 Drawing Figures

SUSPENSION SYSTEM FOR HITCH ASSEMBLY

This invention concerns scrapers and more particularly an improvement in the ridability of two-axle scrapers and similar two-axle vehicles in which a tractor is connected to a trailing unit by an articulated connection.

In most two-axle rubber-tired scrapers, the axles associated with the overhung tractor and the trailing scraper unit are rigidly connected to each unit so the only resiliency available for the vehicle during movement thereof is that which is provided by the pneumatic tires. As a result, when the scraper is operated at high speeds over rough roads or terrain, the weight of the scraper suspended between the front and rear tires creates a vertical bouncing movement and a rocking action which is extremely uncomfortable for the operator.

Various suspension systems have been proposed to alleviate the above problem and one design found in the prior art is a spring arrangement shown in Armington U.S. Pat. No. 2,460,725. In Armington the hitch assembly is supported on the tractor frame in a manner whereby it is capable of oscillation relative to the tractor about a transverse horizontal axis with the oscillation being resisted by a plurality of springs and a dash pot.

The present invention concerns a suspension system for the hitch assembly of a two-axle scraper that is similar to the Armington arrangement in that the spring support structure is located in the same area. However, rather then pivoting the hitch assembly to the tractor about a transverse axis, the construction according to this invention utilizes a pair of links which not only permit the tractor to pitch about a transverse axis but also allows the tractor and the trailing scraper to experience relative vertical movement. This is accomplished with a suspension system that is combined with a tractor frame having a single transverse axle rigidly connected thereto. The usual hitch assembly, which includes a steering frame member, supports the forward end of the trailing scraper above the axle for relative steering movement about a vertical axis and for relative oscillation about a horizontal axis extending longitudinally of the vehicle. The suspension system is located below the steering frame and connects the hitch assembly to the tractor for controlling bounce and pitch type movement of the tractor and the trailing scraper while the latter is being pulled by the tractor. In the preferred form, the suspension system includes a subframe member which is pivotally connected to the steering frame along the aforesaid longitudinally extending horizontal axis. The subframe member is joined to the tractor through a linkage having front and rear links which have their upper ends respectively pivotally connected to the subframe for rotation about first and second horizontally spaced pivot axes. The lower ends of the front and rear links are respectively pivotally connected to the tractor frame for rotation about third and forth pivot axes and the arrangement is such that a straight line passing through the centers of the pivot axes of the first link intersects a straight line passing through the centers of the pivot axes of the rear link at a point located to the rear of the tractor axle. In addition, an air-oil spring device connects the subframe to the tractor for cushioning the bounce and pitch type movement of the scraper.

The objects of the present invention are to provide a two-axle scraper in which the hitch assembly is connected to the tractor by a linkage which controls bounce and pitch movement of the tractor and the scraper bowl; to provide a suspension linkage for the hitch assembly of a two-axle scraper that includes a pair of pivoted links of equal length that are arranged so that straight lines passing through the centers of the pivotal connections of each link intersect at a point located between the front and rear axle of the scraper so as to allow the tractor and the scraper bowl to pivot about a transverse axis and to move in a vertical direction relative to each other; and to provide a suspension system for an articulated vehicle that is located between the hitch assembly and the tractor and which serves to improve the ridability of the scraper by controlling relative movement between the tractor and the trailing unit through a suspension incorporating an air-oil spring system.

Other objects and features of the present invention will be apparent from following detailed description when taken with the drawings in which.

Figures 1, 2:
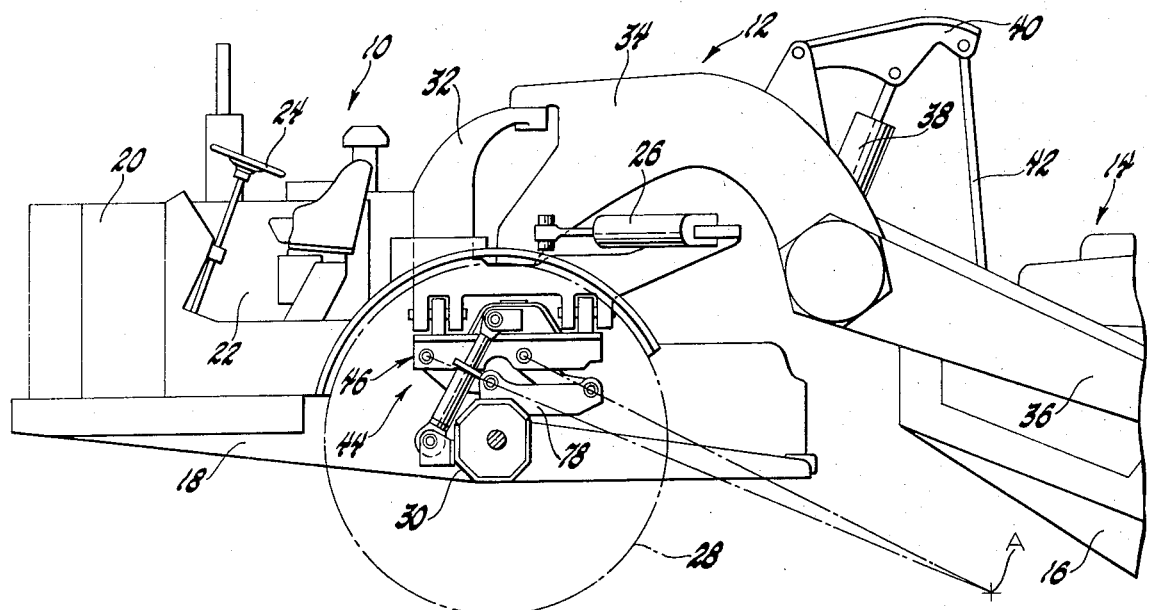
FIG. 1 is an elevational view showing an overhung scraper incorporating a suspension system according to the invention.
FIG. 2 is an enlarged elevational view showing the suspension system of FIG. 1.

Referring now to the drawings and more particularly FIG. 1 thereof an off-highway earth moving scraper is shown comprising the usual overhung tractor 10 which is connected by a hitch assembly 12 to a trailing unit 14. Although not shown, the trailing unit 14 includes the usual scraper bowl 16 supported by a rigid transverse axle having rotatable wheels at the opposite ends thereof. The tractor 10 includes a frame 18 the forward end of which includes an engine compartment 20 and an operator's station 22 having a steering wheel 24 which upon turning movement serves to direct pressurized hydraulic fluid to a pair of steering cylinders 26 incorporated with the hitch assembly 12. The engine compartment 20 includes the usual internal combustion engine, not shown, which through a suitable transmission and gear train directs drive to the tractor wheels 28 located on the opposite ends of a transverse axle 30 which is rigid with the frame 18.

The hitch assembly 12 includes the usual steering frame member 32 which is connected to a gooseneck 34 for relative articulation about a vertical steering axis upon actuation of the steering cylinders 26. The gooseneck 34 includes the usual pull arms 36 which extend rearwardly for supporting the scraper bowl 16 for movement about a transverse horizontal axis as controlled by a hydraulic bowl cylinder 38 carried by the gooseneck 34 and connected to a bowl linkage which includes a lever 40 and a link member 42.

Figure 3:
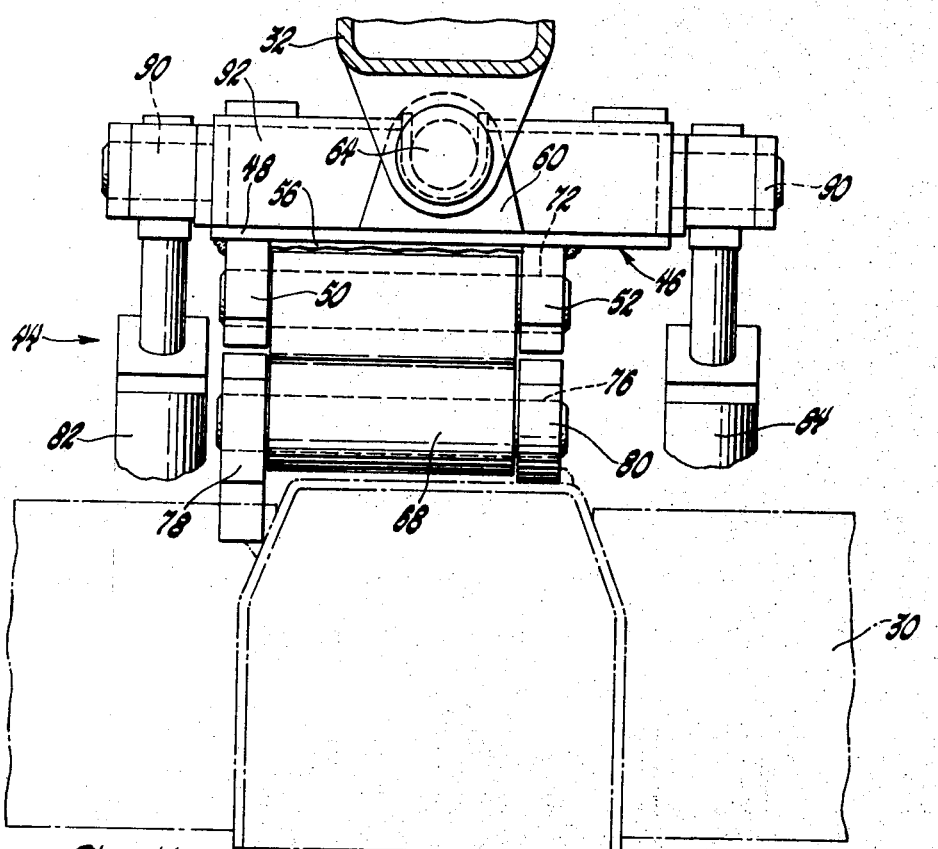
FIG. 3 is a view taken on lines 3—3 of FIG. 2.

Located between the hitch assembly 12 and the axle is a suspension system 44 made in accordance with the invention which serves to control bounce and pitch type movement of the scraper. The suspension system comprises a subframe member 46 which as seen in FIGS. 2 and 3 is generally rectangularly in configuration and is formed with a horizontal flat top plate 48 and a pair of side walls 50 and 52 which are interconnected by reinforcement plate members 54 and 56. A pair of ears 58 and 60 are rigidly formed with the top plate 48 and serve to pivotally interconnect the steering frame 32 to the suspension system 44 through a pair of horizontal pins 62 and 64 thereby allowing the tractor 10 to oscillate relative to the hitch assembly 12 about a horizontal axis that extends longitudinally of the scraper.

Figure 4:
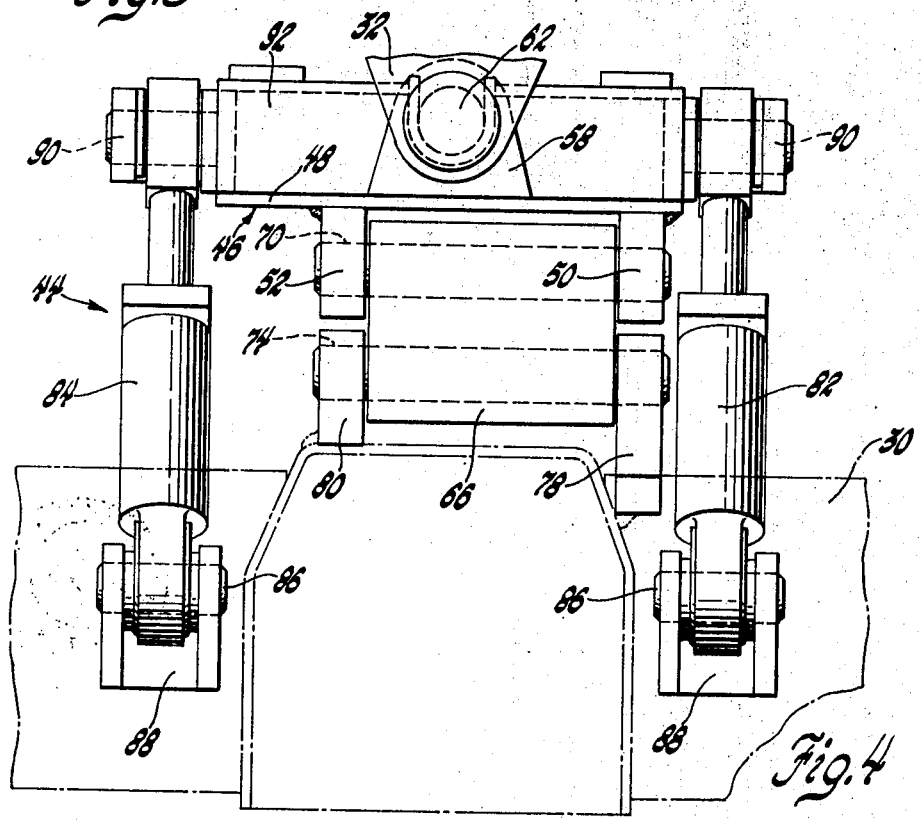
FIG. 4 is a front end view of the suspension system taken on lines 4—4 of FIG. 2.

A front link 66 and a rear link 68 pivotally interconnect the subframe member 46 to the tractor frame 18 above the axle 30, and as seen in FIGS. 2, 3 and 4, the upper ends of the front and rear links are pivotally supported by the side walls 50 and 52 of the subframe member 46 by transverse pins 70 and 72. The lower ends of the front and rear links 66 and 68 are pivotally connected by transverse pins 74 and 76 which extend between vertical walls 78 and 80 rigid with the axle 30. The longitudinal center axes of the pins 70 and 74 of the front link 66 and the longitudinal center axes of the pins 72 and 76 of the rear link 68 are so located that straight lines passing through the centers of the pins of each link will intersect at a point located to the rear of the axle 30 and below the axis of wheel rotation. This is shown in FIG. 1 of the drawings wherein the point of intersection is located at a point "A." This arrangement of the front and rear links will cause the front end of the tractor to rotate along an arc having its center above the axle 30. Thus, if the front wheels or the rear wheels of the scraper encounter a bumper, the suspension links will allow the tractor 10 and the scraper bowl 16 to pitch relative to each other. Also, as should be apparent, relative vertical movement of the tractor 10 and the scraper bowl 16 can be realized with the distorted parallelogram suspension linkage. Moreover, both pitch and bounce type movements are cushioned by a pair of hydraulic cylinders 82 and 84 each of which consists of relatively movable cylinder and rod members. The cylinder member of each hydraulic cylinder 82 and 84 is pivotally connected by a pin connection 86 to a rigid bracket 88 fixed with the front of the axle 30 as seen in FIGS. 2 and 4. The rod end of each of the hydraulic cylinders 82 and 84 is pivotally connected to a stub pin 90 which is rigidly fixed with each side of a transverse housing 92 that is secured to the top plate 48 between the ears 58 and 60 formed with the subframe member 46. Thus, as seen in FIG. 2, the longitudinal center axes of the cylinders 82 and 84 pass between the centers of pins 70 and 74 and are so angled that both bounce or vertical movement and pitch movement experienced by the scraper will cause the cylinders to telescope. Although not shown, it will be understood that a suitable fluid circuit is incorporated with the hydraulic cylinders 82 and 84 for causing the latter to have self leveling capabilities so as to maintain the position of the hitch assembly 12 relative to the tractor at a desired elevation when the scraper bowl 16 is empty and when it is loaded. Such fluid circuit would also include an accumulator fluidly connected to the hydraulic cylinders 82 and 84 and serving as a spring means for absorbing shock loads imposed upon the hydraulic cylinders.

Various changes and modifications can be made in this construction without departing from the spirit of the invention. Such changes and modifications are contemplated by the inventors and they do not wish to be limited except by the scope of the appended claims.

We claim:

1. In combination, a tractor having a frame and a single axle housing rigidly carried by said frame, driving wheels rotatably mounted on opposite ends of said axle housing, a trailing unit having wheel means at the rear end thereof, a hitch assembly including a steering frame supporting the forward end of the trailing unit on the tractor above the axle housing for relative steering movement about a vertical axis and for relative oscillation about a horizontal axis extending longitudinally of the tractor, the improvement of a suspension system located below said steering frame for connecting the hitch assembly to said tractor and for controlling bounce and pitch type movement of said trailing unit while the latter is being pulled by said tractor, said suspension system comprising a sub-frame connected to said steering frame along said horizontal axis, a linkage connecting the sub-frame to the tractor, said linkage including front and rear links having their upper ends respectively pivotally connected to the sub-frame for rotation about first and second horizontally spaced pivot axes, the lower ends of said front and rear links being respectively pivotally connected to said tractor for rotation about third and fourth pivot axes, the front and rear links being so arranged that a straight line passing through the centers of the first and third pivot axes on the front link intersects a straight line passing through the centers of the second and fourth pivot axes on the rear link at a point located to the rear of said axle housing, and spring means connected between said sub-frame and the tractor for cushioning said bounce and pitch type movement of the trailing unit.

2. In combination, a tractor having a frame and a single axle housing rigidly carried by said frame, driving wheels rotatably mounted on opposite ends of said axle housing, a trailing unit having wheel means at the rear end thereof, a hitch assembly including a steering frame supporting the forward end of the trailing unit on the tractor above the axle housing for relative steering movement about a vertical axis and for relative oscillation about a horizontal axis extending longitudinally of the tractor, the improvement of a suspension system located below said steering frame for connecting the hitch assembly to said tractor and for controlling bounce and pitch type movement of said trailing unit while the latter is being pulled by said tractor, said suspension system comprising a sub-frame connected to said steering frame along said horizontal axis, a linkage connecting the sub-frame to the tractor, said linkage including front and rear links having their upper ends respectively pivotally connected to the sub-frame for rotation about first and second horizontally spaced pivot axes, the lower ends of said front and rear links being respectively pivotally connected to said tractor for rotation about third and fourth pivot axes, the front and rear links being so arranged that a straight line passing through the centers of the pivot axes on the first link intersects a straight line passing through the centers of the pivot axes on the rear link at a point located to the rear of and below said axle housing, and a pair of cylinder means pivotally connected between said sub-frame and the axle housing for cushioning said bounce and pitch type movement of the trailing unit and being located along a transverse plane that passes between said first and third pivot axes of the front link.

* * * * *